US012667040B2

(12) United States Patent
Schroeder et al.

(10) Patent No.: US 12,667,040 B2
(45) Date of Patent: Jun. 30, 2026

(54) SYSTEM AND METHOD FOR DETECTING DISK BLADE DAMAGE ON AN AGRICULTURAL IMPLEMENT BY ANALYZING IMAGE DATA CAPTURED BY A REAR FACING CAMERA AND DETERMINING VEGETATION IN A LANE OF A FIELD IN ORDER TO PERFORM CORRECTIVE ACTION

(71) Applicants: CNH Industrial America LLC, New Holland, PA (US); CNH Industrial Canada, Ltd., Saskatoon (CA)

(72) Inventors: Brittany Schroeder, Bunker Hill, IN (US); Christopher Barrick, Morton, IL (US); James W. Henry, Saskatoon (CA)

(73) Assignees: CNH Industrial America LLC, New Holland, PA (US); CNH Industrial Canada, Ltd., Saskatoon (CA)

( * ) Notice: Subject to any disclaimer, the term of this patent is extended or adjusted under 35 U.S.C. 154(b) by 349 days.

(21) Appl. No.: 18/203,971

(22) Filed: May 31, 2023

(65) Prior Publication Data

US 2024/0401309 A1 Dec. 5, 2024

(51) Int. Cl.
    *A01B 79/00*    (2006.01)
    *A01B 15/16*    (2006.01)
    (Continued)

(52) U.S. Cl.
    CPC .............. *A01B 76/00* (2013.01); *A01B 15/16* (2013.01); *A01B 49/027* (2013.01); *A01B 79/005* (2013.01); *E02F 9/268* (2013.01)

(58) Field of Classification Search
    CPC . B65B 29/022; B65B 29/025; B65B 85/8043; B65B 85/8046; A01B 15/16;
    (Continued)

(56) References Cited

U.S. PATENT DOCUMENTS

2020/0344939 A1* 11/2020 Sporrer ................... H04N 23/54
2020/0362542 A1* 11/2020 Veasy ...................... E02F 3/765
(Continued)

FOREIGN PATENT DOCUMENTS

WO    WO 2022/132327 A1    6/2022
WO    WO 2022/229735 A1   11/2022

OTHER PUBLICATIONS

U.S. Appl. No. 17/990,129, filed Nov. 18, 2022.

*Primary Examiner* — Chad Dickerson
(74) *Attorney, Agent, or Firm* — Dority & Manning, P.A.

(57) ABSTRACT

A system for detecting disk blade damage on an agricultural implement includes a disk blade configured to rotate relative to soil within a field across which the agricultural implement is traveling. Moreover, the system includes an imaging device configured to generate image data depicting an aft portion of the field located rearward of the disk blade relative to a direction of travel of the agricultural implement, with the aft portion of the field including a lane of the field to be worked by the disk blade. In addition, a computing system is configured to analyze the image data generated by the imaging device to identify when vegetation is present within the lane of the field. Furthermore, the computing system is configured to determine that the disk blade is damaged when the vegetation is present within the lane of the field.

7 Claims, 6 Drawing Sheets

(51) Int. Cl.
   *A01B 49/02*        (2006.01)
   *A01B 76/00*        (2006.01)
   *E02F 9/26*         (2006.01)

(58) Field of Classification Search
   CPC ..... A01B 49/027; A01B 76/00; A01B 79/005;
                   B23C 2200/367; E02F 9/268
   USPC .................................................. 382/173, 110
   See application file for complete search history.

(56)                References Cited

U.S. PATENT DOCUMENTS

| | | | |
|---|---|---|---|
| 2021/0105928 A1* | 4/2021 | Henry .................. | A01B 63/245 |
| 2021/0123728 A1 | 4/2021 | Smith | |
| 2021/0127546 A1* | 5/2021 | Smith .................... | A01B 47/00 |
| 2021/0137006 A1 | 5/2021 | Shearer et al. | |
| 2021/0267121 A1* | 9/2021 | Childs ....................... | G01J 3/50 |

* cited by examiner

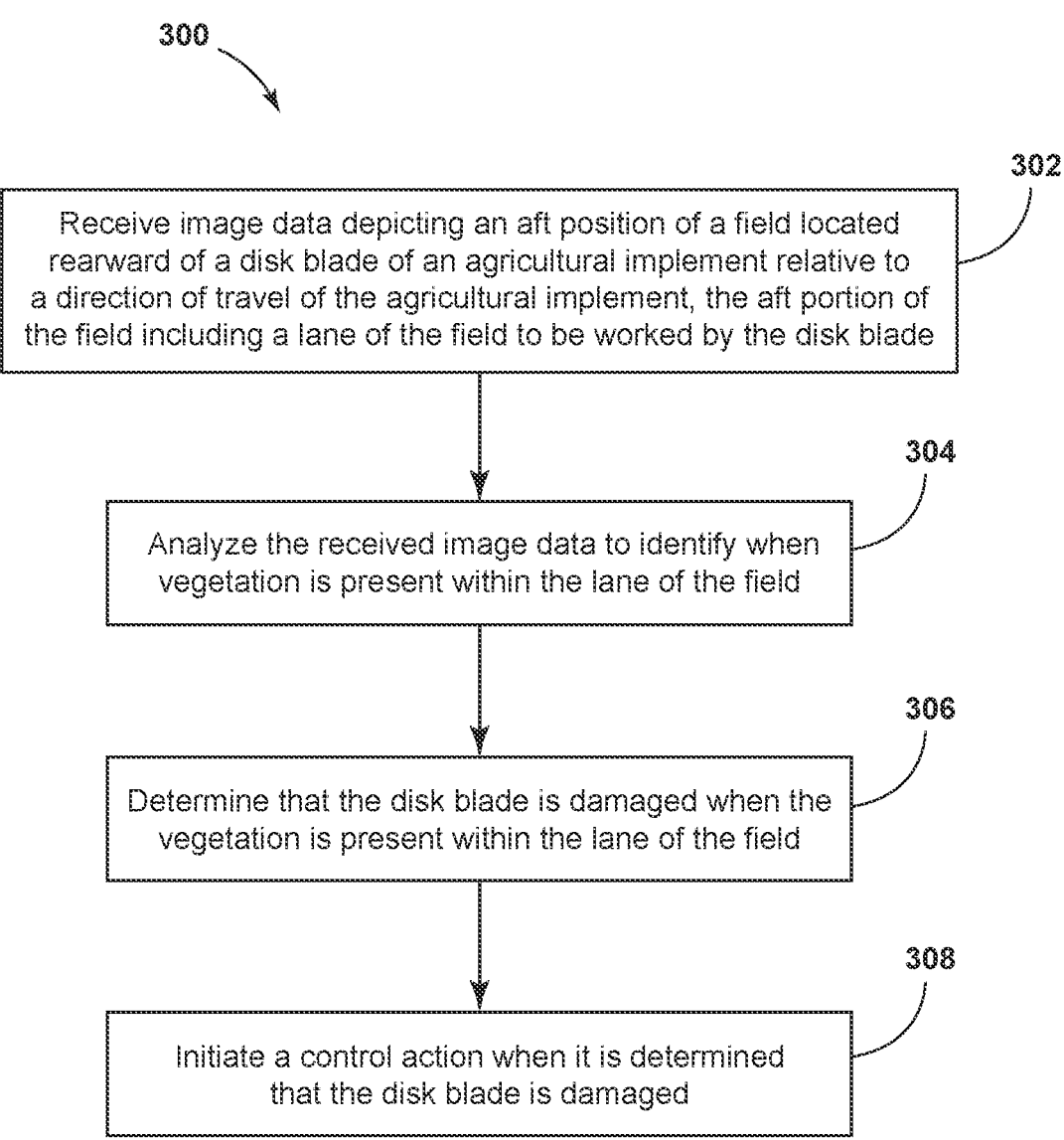

300

302
Receive image data depicting an aft position of a field located rearward of a disk blade of an agricultural implement relative to a direction of travel of the agricultural implement, the aft portion of the field including a lane of the field to be worked by the disk blade 304
Analyze the received image data to identify when vegetation is present within the lane of the field 306
Determine that the disk blade is damaged when the vegetation is present within the lane of the field 308
Initiate a control action when it is determined that the disk blade is damaged

FIG. 6

SYSTEM AND METHOD FOR DETECTING DISK BLADE DAMAGE ON AN AGRICULTURAL IMPLEMENT BY ANALYZING IMAGE DATA CAPTURED BY A REAR FACING CAMERA AND DETERMINING VEGETATION IN A LANE OF A FIELD IN ORDER TO PERFORM CORRECTIVE ACTION

FIELD OF THE INVENTION

The present disclosure generally relates to agricultural implements and, more particularly, to systems and methods for detecting disk blade damage on an agricultural implement.

BACKGROUND OF THE INVENTION

It is well known that, to attain the best agricultural performance from a field, a farmer must cultivate the soil, typically through a tillage operation. Modern farmers perform tillage operations by pulling an agricultural implement, such as a tillage implement, behind an agricultural work vehicle, such as a tractor. For example, tillage implements generally include ground-engaging tools, such as shanks, disk blades, and/or the like, supported on its frame. Each ground-engaging tool, in turn, is configured to be moved relative to the soil within the field as the tillage implement travels across the field. Such movement of the ground-engaging tools loosens and/or otherwise agitates the soil to prepare the field for subsequent planting operations.

As an agricultural implement travels across the field, the implement may encounter rocks or other impediments within the soil. Contact with such impediments may, in certain instances, result in damage to the disk blades or other ground-engaging tools. Damaged disk blades or other ground-engaging tools may, in turn, result in an uneven seedbed, which can hinder the growth of the plants that will be subsequently planted. In this respect, systems have been developed to detect damaged disk blades during agricultural operations. While such systems work well, further improvements are needed.

Accordingly, an improved system and method for detecting disk blade damage on an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement including a frame and a disk blade supported relative to the frame and configured to rotate relative to soil within a field across which the agricultural implement is traveling. The agricultural implement further includes an imaging device configured to generate image data depicting an aft portion of the field located rearward of the disk blade relative to a direction of travel of the agricultural implement, with the aft portion of the field including a lane of the field to be worked by the disk blade. Furthermore, the agricultural implement includes a computing system communicatively coupled to the imaging device. In this respect, the computing system is configured to analyze the image data generated by the imaging device to identify when vegetation is present within the lane of the field.

Additionally, the computing system is configured to determine that the disk blade is damaged when the vegetation is present within the lane of the field.

In another aspect, the present subject matter is directed to a system for detecting disk blade damage on an agricultural implement. The system includes a disk blade configured to rotate relative to soil within a field across which the agricultural implement is traveling. Moreover, the system includes an imaging device configured to generate image data depicting an aft portion of the field located rearward of the disk blade relative to a direction of travel of the agricultural implement, with the aft portion of the field including a lane of the field to be worked by the disk blade. In addition, the system includes a computing system communicatively coupled to the imaging device. As such, the computing system is configured to analyze the image data generated by the imaging device to identify when vegetation is present within the lane of the field. Furthermore, the computing system is configured to determine that the disk blade is damaged when the vegetation is present within the lane of the field.

In a further aspect, the present subject matter is directed to a method for detecting disk blade damage on an agricultural implement. The agricultural implement, in turn, includes a disk blade configured to rotate relative to soil within a field across which the agricultural implement is traveling. The method includes receiving, with a computing system, image data depicting an aft portion of the field located rearward of the disk blade relative to a direction of travel of the agricultural implement, with the aft portion of the field including a lane of the field to be worked by the disk blade. Additionally, the method includes analyzing, with the computing system, the received image data to identify when vegetation is present within the lane of the field. Moreover, the method includes determining, with the computing system, that the disk blade is damaged when the vegetation is present within the lane of the field. In addition, the method includes initiating, with the computing system, a control action when it is determined that the disk blade is damaged.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 6 illustrates a flow diagram of one embodiment of a method for detecting disk blade damage on an agricultural implement in accordance with aspects of the present subject matter.

Figure 1:
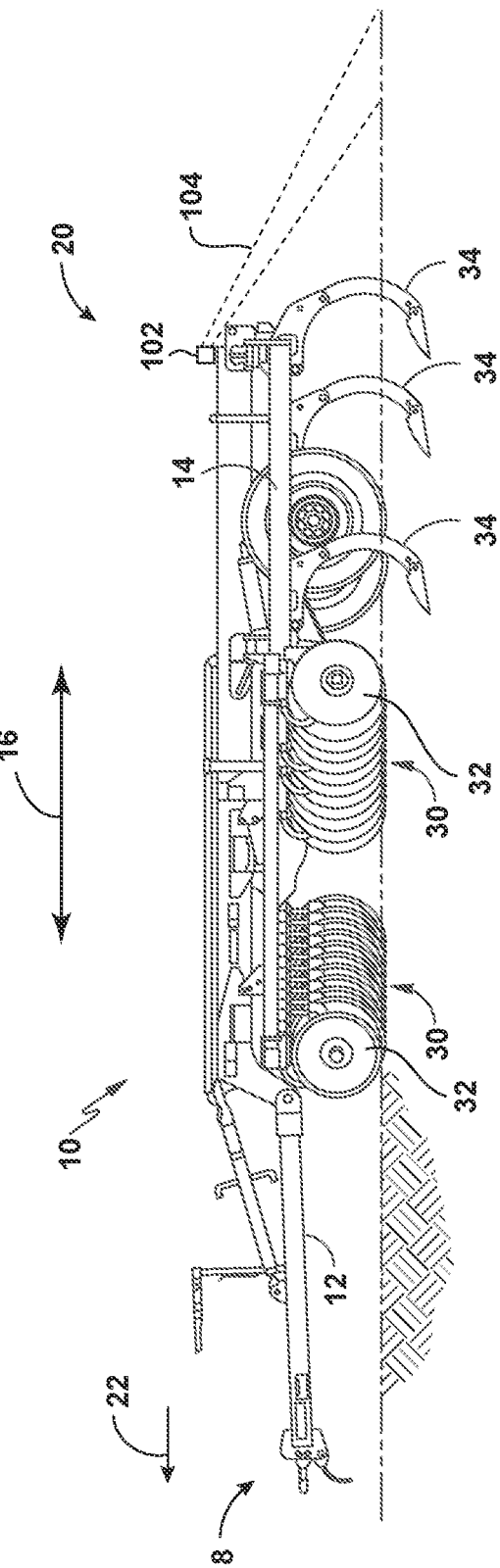
FIG. 1 illustrates a side view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for detecting disk blade damage on an agricultural implement, such as a tillage implement or a seed-planting implement. As will be described below, the agricultural implement includes one or more disk blades supported relative to its frame. Each disk blade is, in turn, configured to rotate relative to the soil in the field across which the agricultural implement is traveling.

In several embodiments, a computing system of the disclosed system is configured to determine when the disk blade(s) are damaged based on the presence of vegetation aft of the agricultural implement. More specifically, the computing system is configured to receive image data depicting an aft portion of the field located rearward of the disk blade(s) relative to the direction of travel of the agricultural implement. The aft portion of the field, in turn, includes one or more lanes, with each lane corresponding to the lateral swath of the field to be worked by one of the disk blades. In this respect, the computing system is configured to analyze the received image data to identify when vegetation is present within the lane(s) of the field. Furthermore, the computing system is configured to determine that a given disk blade is damaged (e.g., the disk blade is bent, a portion is of the disk blade is missing, the entire disk blade is missing, etc.) when vegetation is present within the corresponding lane of the field. For example, in some embodiments, the computing system may classify each pixel within the received image data as one of a vegetation pixel or a non-vegetation pixel, such as based on color. Moreover, in such embodiments, the computing system may determine the number of vegetation pixels present within each lane. Thereafter, when the number of vegetation pixels present within a given lane exceeds a threshold value, the computing system may determine that vegetation is present in that lane and the corresponding disk blade is damaged.

Determining that a disk blade of an agricultural implement is damaged based on the presence of vegetation aft of the implement improves the operation of the implement. More specifically, during normal operation of an undamaged disk blade, the lane of the field aft of that disk blade will be free of or substantially free of vegetation, such as weeds, cover crops, and the like. That is, the operation of an undamaged disk blade removes all or substantially all vegetation in its path. However, when a disk blade becomes damaged, such disk blade will not properly work the soil, thereby leaving vegetation in the corresponding lane of the field aft of the disk blade. In this respect, by identifying the presence of vegetation aft of the disk blades, the disclosed system and method can detect when a disk blade(s) has become damaged. This, in turn, allows for corrective action to be taken quickly, thereby improving the agricultural performance of the field.

Figure 2:
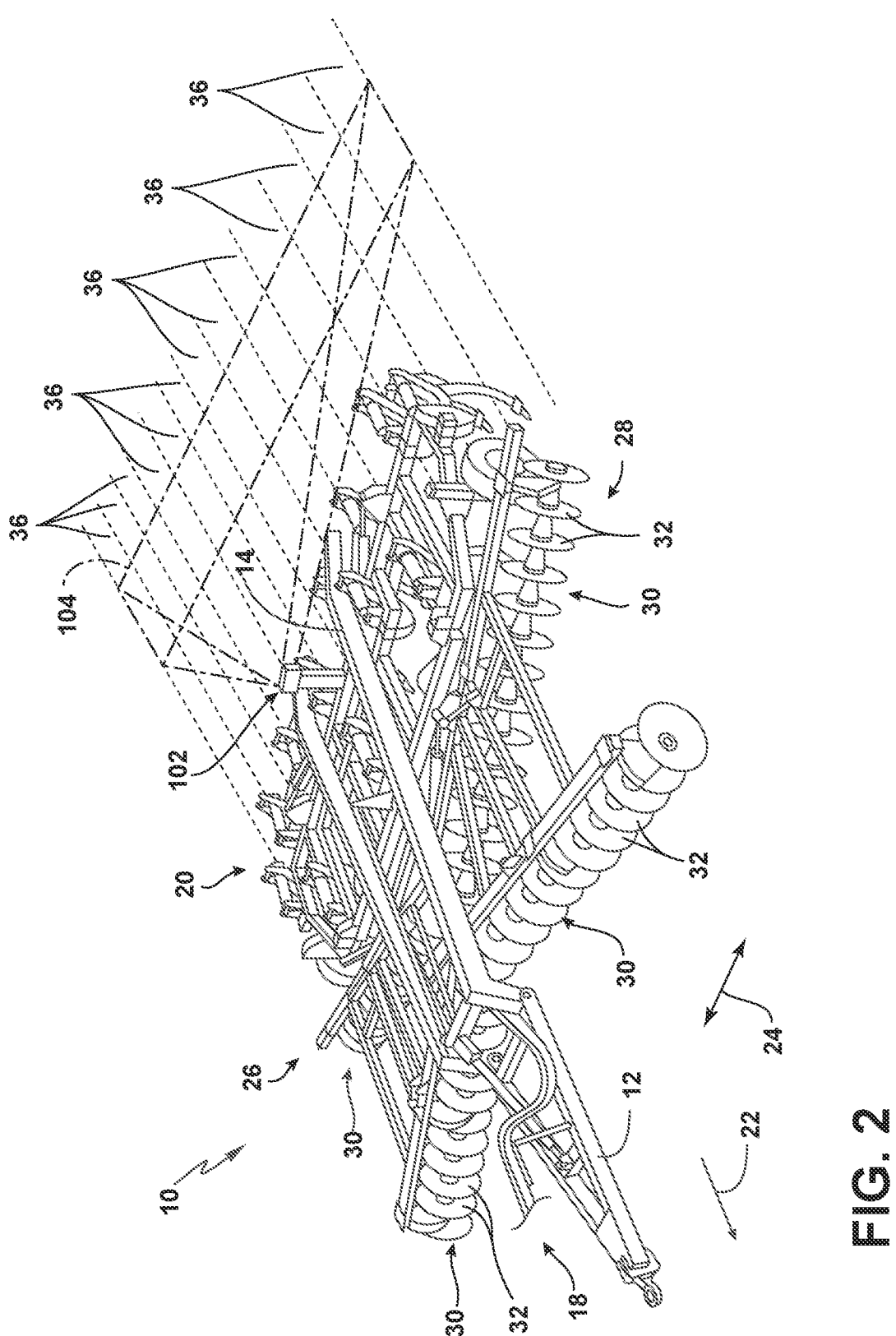
FIG. 2 illustrates a perspective view of the agricultural implement shown in FIG. 1, particularly illustrating an aft portion of the field rearward of the agricultural implement.

Referring now to the drawings, FIGS. 1 and 2 illustrate differing views of one embodiment of an agricultural implement 10 in accordance with aspects of the present subject matter. Specifically, FIG. 1 illustrates a side view of the agricultural implement 10. Additionally, FIG. 2 illustrates a perspective view of the agricultural implement 10, particularly illustrating an aft portion of the field rearward of the implement 10.

As shown, in the illustrated embodiment, the agricultural implement 10 is configured as a tillage implement. However, in other embodiments, the implement 10 may have any other suitable implement configuration, such as by being configured as any other suitable tillage implement (e.g., a cultivator) or other implement (e.g., a planter, seeder, fertilizer, and/or the like).

As shown in FIGS. 1 and 2, the agricultural implement 10 includes a tow bar 12 having a coupling mechanism, such as a hitch, used to couple the implement 10 to a towing vehicle, such as a tractor or any other suitable work vehicle. The agricultural implement 10 may also include a frame 14 extending in a longitudinal direction (indicated by arrow 16) between a forward end 18 and an aft end 20 of the implement 10. The longitudinal direction 16 is, in turn, parallel to a direction of travel 22 of the agricultural implement 10. As shown in FIG. 2, the agricultural implement 10 also extends along a lateral direction 24 defined between a first lateral side 26 and a second lateral side 28 of the implement 10. The lateral direction 24 is, in turn, perpendicular to the direction of travel 22 and the longitudinal direction 16.

The agricultural implement 10 may further include a plurality of ground-engaging tools coupled to or otherwise supported by the frame 14, such as one or more disk blades, plows, chisels, hoe openers, tillage points, rolling baskets, and/or the like. For instance, as shown in FIGS. 1 and 2, the agricultural implement 10 includes a plurality of gangs or sets 30 of disk blades 32. As will be described below, the disk blades 32 are spaced apart from each other along the length of the disk gang 30 and configured to rotate relative to the soil within the field as the agricultural implement 10 travels across the field in the direction of travel 22. Furthermore, each disk blade 32 may include both a concave side (not shown) and a convex side (not shown). In addition, the various gangs 30 of disk blades 32 may be oriented at an angle relative to the direction of travel 22 to promote more effective tilling of the soil. Moreover, in the illustrated embodiment, the agricultural implement 10 includes a plurality of ground-engaging shanks 34 located aft of the disk gangs 30 on the frame 14. The shanks 34 are, in turn, configured to till or otherwise engage the soil as the implement 10 is towed across the field.

Furthermore, the agricultural implement 10 may include one or more imaging devices 102 coupled thereto and/or supported thereon. More specifically, the imaging device(s) 102 is configured to generate image data depicting a portion of the field present within its field of view 104 as the implement 10 moves across the field in the direction of travel 22. Specifically, as shown in FIGS. 1 and 2, each imaging device 102 may be supported relative to the implement 10 (e.g., adjacent to the aft end 20 of the implement 10) such that the field of view 104 of the imaging device 102 is directed towards an aft portion of the field disposed rearward of the implement 10 relative to the direction of travel 22 of the implement 10. In this respect, and as will be described below, the image data generated by the imaging device(s) 102 is analyzed to identify vegetation (e.g., weeds, cover crops, etc.) present within the field aft of the implement 10. The presence or lack of vegetation aft of the implement 10 can subsequently be used to determine when one or more of the disk blades 32 of the agricultural implement 10 are damaged.

In general, the imaging device(s) 102 may correspond to any suitable sensing devices configured to generate image data or image-like data depicting the surface of the field. Specifically, in several embodiments, the imaging device(s) 102 may correspond to a suitable camera(s) configured to capture images of the surface of the field present within the field of view 104, thereby allowing any vegetation present on the surface of the field to be identified by analyzing the content of each image. Alternatively, the imaging device(s) 102 may correspond to any other suitable devices for generating image data or image-like data, such as a LiDAR device(s), a RADAR device(s), and/or the like.

As shown in FIG. 2, in several embodiments, the aft portion of the field located rearward of the agricultural implement 10 may be divided along the lateral direction 24 into lateral portions or lanes 36. Each lane 36 is associated with a respective one of the disk blades 32. Specifically, each lane 36 is aligned along the direction of travel 22 with and worked by a respective disk blade 32. In general, there should be no vegetation or substantially no vegetation present within each of the lanes 36 aft of the implement 10 when the disk blades 32 are not damaged. However, when a given disk blade 32 becomes damaged (e.g., the blade 32 is bent, a piece of the blade 32 has broken off, or the entire disk blade 32 is missing, etc.), there may be significant vegetation present within the corresponding lane 36. As such, the presence of vegetation within one of the lanes 36 may be indicative that the corresponding disk blade 36 has become damaged, as will be described in greater detail below.

Although the implement 10 is shown as only including or being associated with one imaging device 102, the implement 10 may include or be associated with any other suitable number of imaging devices 102, such as two or more imaging devices 102. Further, in alternative embodiments, the imaging devices 102 may be supported at any other suitable location on the implement 10 and/or vehicle towing the implement 10 such that the field of view 104 of the imaging device 102 is directed towards the aft portion of the field and/or any other suitable portion of the field.

Figure 3:
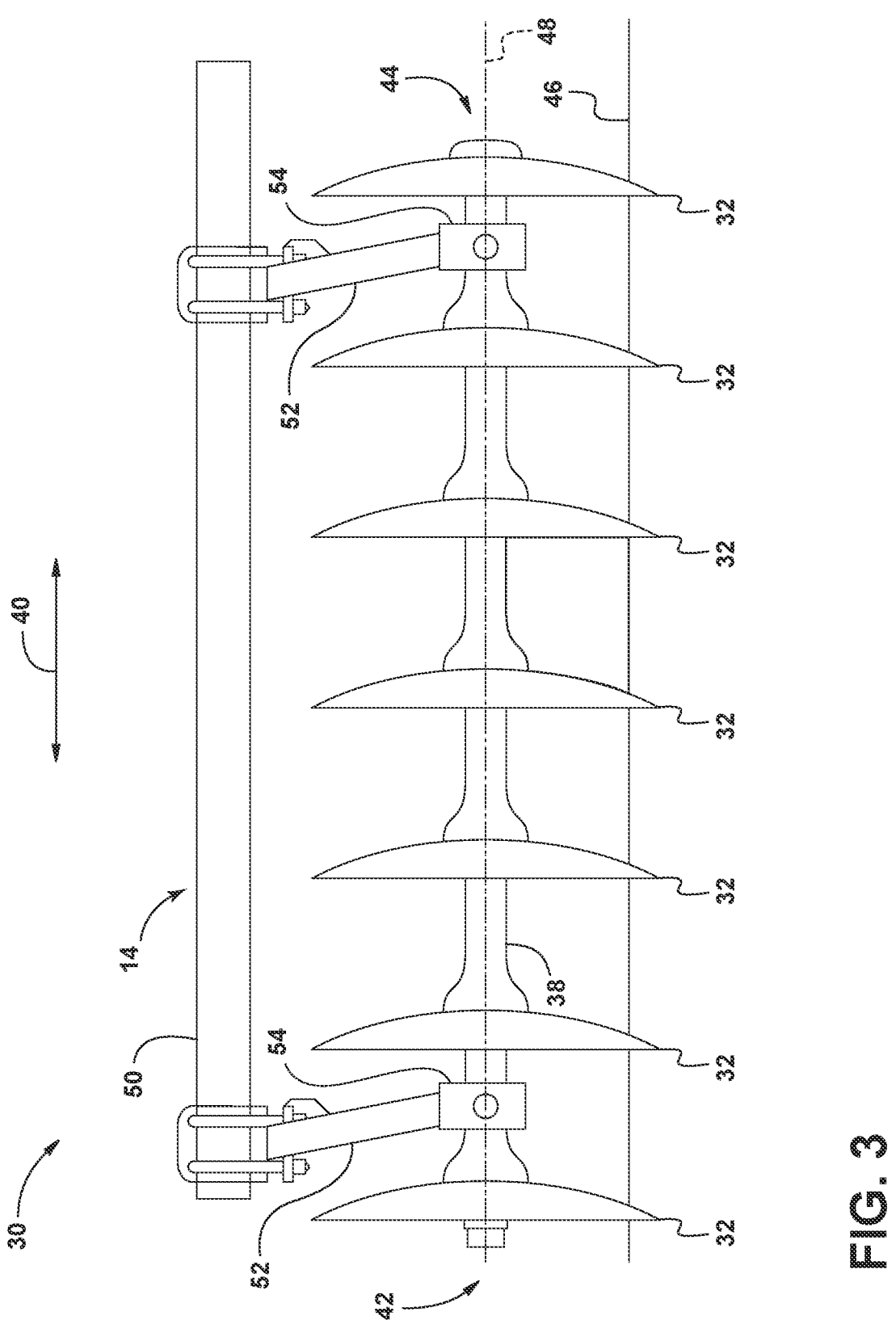
FIG. 3 illustrates a front view of one embodiment of a disk gang of an agricultural implement in accordance with aspects of the present subject matter.

Referring now to FIG. 3, a front view of one embodiment of one of the disk gangs 30 of the implement 10 is illustrated in accordance with aspects of the present subject matter. Specifically, in several embodiments, the disk gang 30 may include a disk gang shaft 38 that extends along an axial direction or length of the disk gang 30 (indicated by arrow 40 in FIG. 3) between a first end 42 and a second end 44. As shown, the disk blades 32 are coupled to the disk gang shaft 38 and spaced apart from each other along the axial direction 40. As the implement 10 travels across a field, the disk blades 32 penetrate the soil surface (indicated by line 46 in FIG. 3) of the field and rotate about an axis of rotation (indicated by dashed line 48 in FIG. 3) relative to the soil within the field.

In general, the disk gang 30 is supported relative to a corresponding support arm 50 coupled to the frame 14 of the agricultural implement 10. Specifically, in several embodiments, a pair of hangers 52 (e.g., C-hangers) support the disk gang 30 at a position below the support arm 50. For example, in one embodiment, one end of each hanger 52 may be coupled to the support arm 50, while the opposing end of each hanger 52 is coupled to a bearing block 54. The bearing blocks 54, in turn, are rotatably coupled to the disk gang shaft 38. However, in alternative embodiments, the disk gang 30 may have any other suitable configuration. Additionally, in other embodiments, the disk blades 32 may be mounted or otherwise supported on the frame 14 in any other suitable manner, such as via individually (e.g., each disk blade includes its own hanger), in pairs (e.g., each pair of disk blades shares a hanger), or the like.

The configuration of the agricultural implement 10 described above and shown in FIGS. 1-3 is provided only to place the present subject matter in an exemplary field of use. Thus, the present subject matter may be readily adaptable to any manner of agricultural implement configurations.

Figure 4:
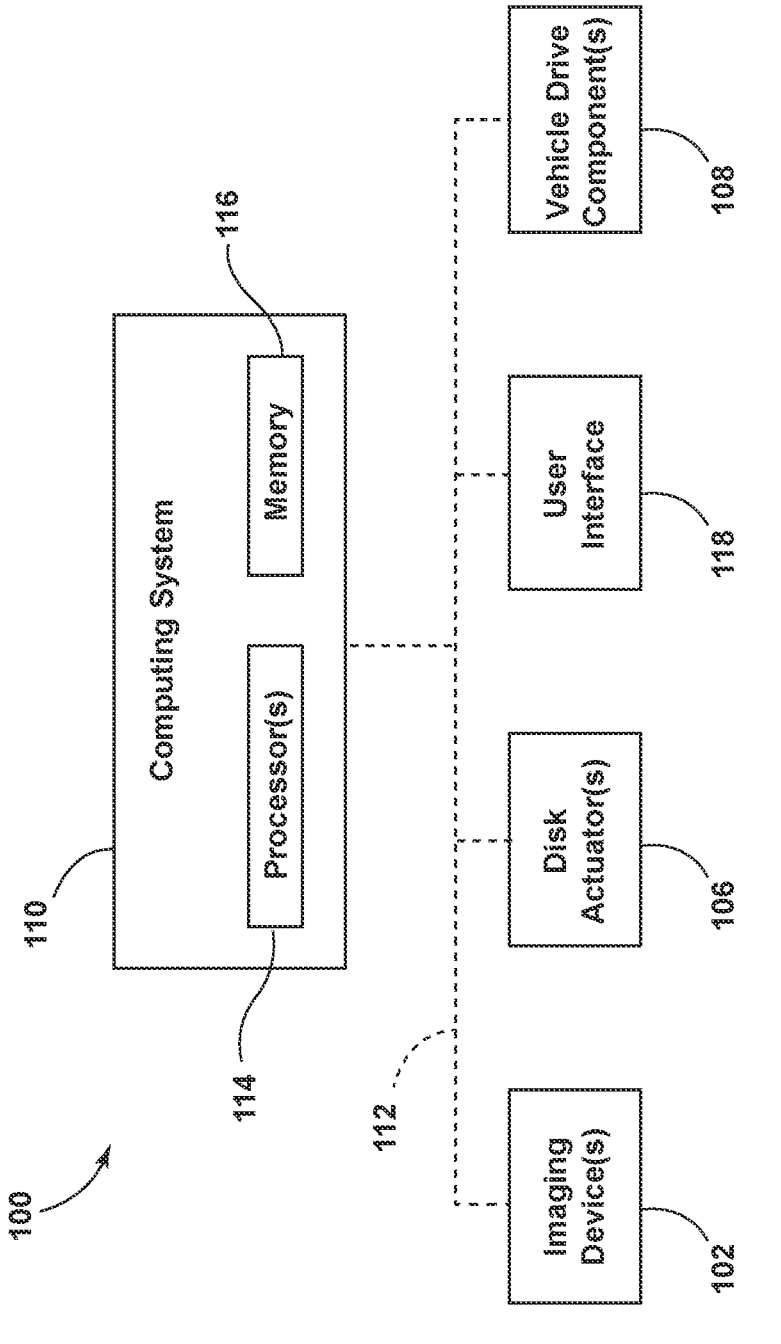
FIG. 4 illustrates a schematic view of one embodiment of a system for detecting disk blade damage on an agricultural implement in accordance with aspects of the present subject matter.

Referring now to FIG. 4, a schematic view of one embodiment of a system 100 for detecting disk blade damage on an agricultural implement is illustrated in accordance with aspects of the present subject matter. In general, the system 100 will be described herein with reference to the agricultural implement 10 described above with reference to FIGS. 1-3. However, it should be appreciated by those of ordinary skill in the art that the disclosed system 100 may generally be utilized with agricultural implements having any other suitable implement configuration.

As shown in FIG. 4, the system 100 includes one or more disk actuators 106. In general, each disk actuator 106 is configured to adjust the position of and/or the force being applied to one or more of the disk blades 32. For example, in one embodiment, one disk actuator 106 may be coupled between the frame 14 and the support arm 50 of each disk gang 30. In such an embodiment, each disk actuator 106 may be configured to adjust the position of and/or the force being applied to the corresponding disk gang 30. However, in alternative embodiments, the disk actuator(s) 106 may adjust the position of and/or the force being applied to disk blades 32 in any other suitable manner.

The disk actuator(s) 106 may be configured as any suitable type of device(s) configured to adjust the position of and/or the force being applied to the disk blades 32. For example, in one embodiment, the disk actuator(s) 106 may be configured as a hydraulic cylinder(s). However, in other embodiments, the disk actuator(s) 106 may be configured as a pneumatic cylinder(s), an electric linear actuator(s), or the like.

Additionally, the system 100 may include one or more vehicle drive components 108 of a work vehicle (not shown) coupled to the implement 10. Specifically, in several embodiments, the vehicle drive component(s) 108 may include the engine, transmission, brake actuator(s), and/or the like of the work vehicle. In this respect, by controlling the operation of the vehicle drive component(s) 108, the ground speed at which the implement 10 travels across the field may be adjusted. For example, as will be described below, by controlling the operation of the vehicle drive component(s) 108, forward movement of the implement 10 may be halted, such as when it is determined that one or more of the disk blades 32 are damaged.

Furthermore, the system 100 includes a computing system 110 communicatively coupled to one or more components of the agricultural implement 10, an associated work vehicle (not shown), and/or the system 100 to allow the operation of such components to be electronically or automatically controlled by the computing system 110. For instance, the computing system 110 may be communicatively coupled to the imaging device(s) 102 via a communicative link 112. As such, the computing system 110 may be configured to receive image data from the imaging device(s) 102 that depicts a portion of the field aft of the disk blades 32 of the implement 10. Furthermore, the computing system 110 may be communicatively coupled to the disk actuator(s) 106 and/or the vehicle drive component(s) 108 via the communicative link 112. In this respect, the computing system 110 may be configured to control the operation of the disk actuator(s) 106 to adjust the position of and/or the force being applied to the disk blades 32. Moreover, the computing system 110 may be configured to control the operation of vehicle drive component(s) 108 to adjust the ground speed at which the implement 10 is traveling or halt the implement 10. In addition, the computing system 110 may be communicatively coupled to any other suitable components of the agricultural implement 10 and/or the system 100.

In general, the computing system 110 may comprise one or more processor-based devices, such as a given controller or computing device or any suitable combination of controllers or computing devices. Thus, in several embodiments, the computing system 110 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 116 of the computing system 110 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 116 may generally be configured to store suitable computer-readable instructions that, when implemented by the processor(s) 114, configure the computing system 110 to perform various computer-implemented functions, such as one or more aspects of the methods and algorithms that will be described herein. In addition, the computing system 110 may also include various other suitable components, such as a communications circuit or module, one or more input/output channels, a data/control bus and/or the like.

The various functions of the computing system 110 may be performed by a single processor-based device or may be distributed across any number of processor-based devices, in which instance such devices may be considered to form part of the computing system 110. For instance, the functions of the computing system 110 may be distributed across multiple application-specific controllers or computing devices, such as a navigation controller, an engine controller, a transmission controller, an implement controller, and/or the like.

In addition, the system 100 may also include a user interface 118. More specifically, the user interface 118 may be configured to provide feedback from the computing system 110 (e.g., feedback associated with the presence of damaged disk blades 32) to the operator. As such, the user interface 118 may include one or more feedback devices (not shown), such as display screens, speakers, warning lights, and/or the like, which are configured to provide feedback from the computing system 110 to the operator. As such, the user interface 118 may, in turn, be communicatively coupled to the computing system 110 via the communicative link 112 to permit the feedback to be transmitted from the computing system 110 to the user interface 118. Furthermore, some embodiments of the user interface 118 may include one or more input devices, such as touchscreens, keypads, touchpads, knobs, buttons, sliders, switches, mice, microphones, and/or the like, which are configured to receive inputs from the operator. In this respect, the user interface 118 may be mounted or otherwise positioned at any suitable location, such as within a cab of the work vehicle towing the implement 10 or as part of a remote computing device (e.g., a Smartphone, laptop, tablet, etc.).

Figure 5:
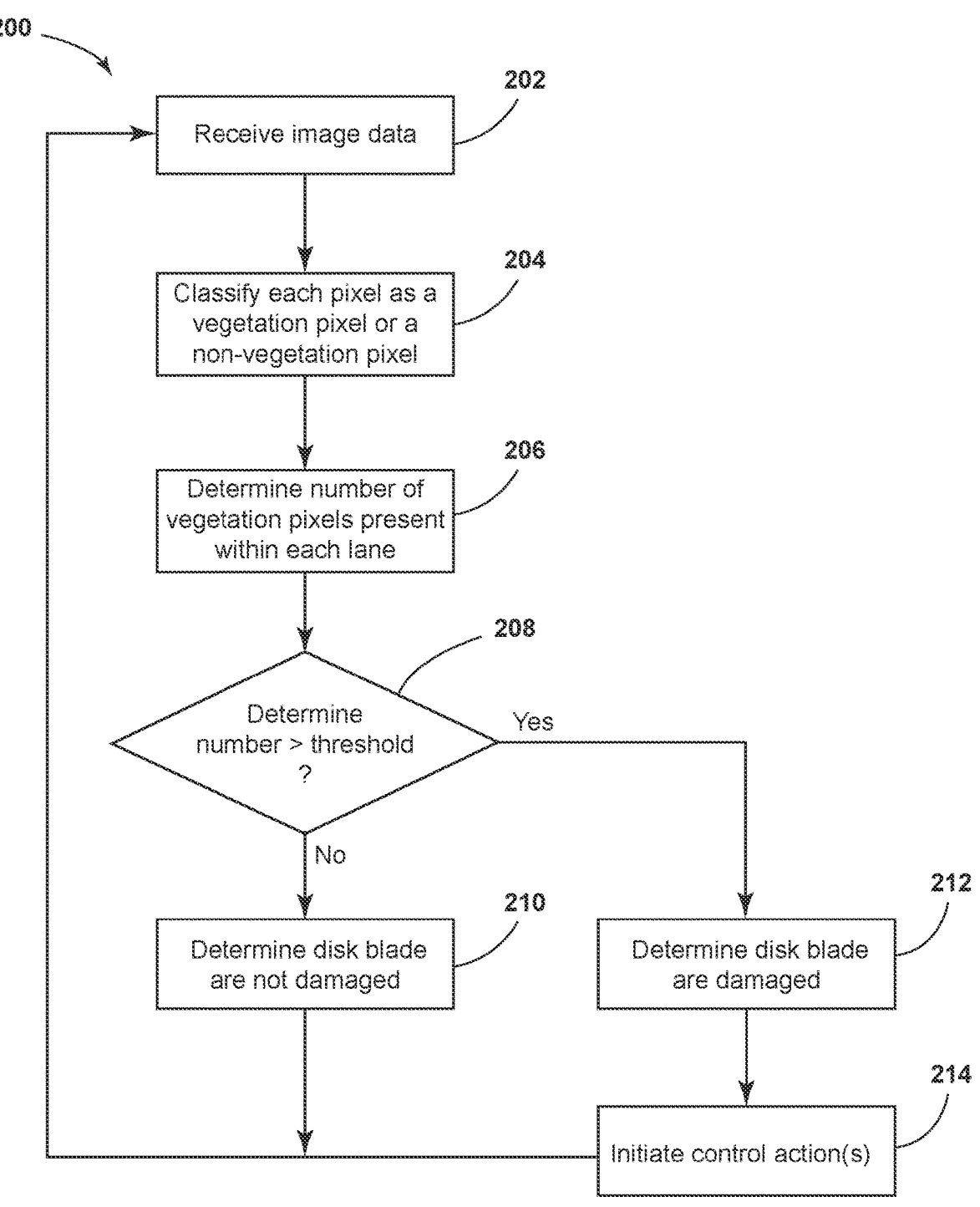
FIG. 5 illustrates a flow diagram providing one embodiment of control logic for detecting disk blade damage on an agricultural implement in accordance with aspects of the present subject matter.

Referring now to FIG. 5, a flow diagram of one embodiment of example control logic 200 that may be executed by the computing system 110 (or any other suitable computing system) for detecting disk blade damage on an agricultural implement) is illustrated in accordance with aspects of the present subject matter. Specifically, the control logic 200 shown in FIG. 5 is representative of steps of one embodiment of an algorithm that can be executed to detect disk blade damage on an agricultural implement based on the presence of vegetation (e.g., weeds, cover crops, etc.) aft of the implement. Thus, in several embodiments, the control logic 200 may be advantageously utilized in association with a system installed on or forming part of an agricultural implement or an associated work vehicle to allow for real-time detection of disk blade damage on an agricultural implement without requiring substantial computing resources and/or processing time. However, in other embodiments, the control logic 200 may be used in association with any other suitable system, application, and/or the like for detecting disk blade damage on an agricultural implement.

As shown, at (202) the control logic 200 includes receiving image data depicting an aft portion of a field located rearward of a disk blade of an agricultural implement relative to the direction of travel of the implement, with the aft portion of the field including a lane of the field to be worked by the disk blade. Specifically, as mentioned above, in several embodiments, the computing system 110 may be communicatively coupled to the imaging device(s) 102 via the communicative link 112. In this respect, as the implement 10 travels across the field to perform an agricultural operation (e.g., a tillage operation) thereon, the computing system 110 may receive image data from the imaging device(s) 102. Such image data may, in turn, depict the aft portion of the field located rearward of the disk blades 32 of the implement 10 relative to the direction of travel 22. Moreover, the aft portion of the field depicted by the received image data includes one or more lanes of the field, with each lane to be worked by one of the disk blades 32. In this respect, and as will be described below, the computing system 110 analyzes the received image data to identify when vegetation is present within one or more of the lanes of the field. Thereafter, when the vegetation is present within one or more lanes of the field, the computing system determines that the disk blades 32 working such lane(s) of the field are damaged.

Furthermore, at (204), the control logic 200 includes classifying each pixel within the received image data as one of a vegetation pixel or a non-vegetation pixel. Specifically, in several embodiments, the computing system 110 may be configured to analyze each image of the image data received at (202) and classify each pixel in such image(s) as either a vegetation pixel or a non-vegetation pixel. In some embodiments, the computing system 110 may classify each pixel as either a vegetation pixel or a non-vegetation pixel based on its color. For example, the computing system 110 may classify green pixels as vegetation pixels and non-green pixels as non-vegetation pixels. However, in alternative embodiments, the computing system 110 may, at (204), classify each pixel within the received image data as one of a vegetation pixel or a non-vegetation pixel in any other suitable manner.

Additionally, at (206), the control logic 200 includes determining the number of the vegetation pixels present within the lane. Specifically, in several embodiments, the computing system 110 may analyze each image of the image data classified at (204) to determine the number of pixels present within each lane of the field that are classified as vegetation pixels.

Moreover, at (208), the control logic 200 includes comparing the determined number of the vegetation pixels to a threshold value. Specifically, in several embodiments, the computing system 110 may be configured to compare the number of pixels classified as vegetation pixels in each lane determined at (206) to a threshold value.

When the determined number of pixels classified as vegetation pixels in a given lane is equal to or falls below a threshold value, the computing system 110 determines that no vegetation (or substantially no vegetation) is present in that lane. Thus, the lack of vegetation indicates that the corresponding disk blade 32 is properly functioning. In such instances, the computing system 110, at (210), determines that the given disk blade 32 is not damaged. Thereafter, the control logic 200 returns to (202) with respect to that disk blade 32.

Conversely, when the determined number of pixels classified as vegetation pixels in a given lane exceeds the threshold value, the computing system 110 determines that vegetation is present in that lane. Thus, the presence of vegetation indicates that the corresponding disk blade 32 is not properly functioning. In such instances, the computing system 110, at (212), determines that the given disk blade 32 is damaged. The use of the threshold value in determining the presence of vegetation prevents stray or small numbers of vegetation pixels that are not indicative of actual vegetation in field from triggering a determination vegetation is present. Thereafter, the control logic 200 proceeds to (214) with respect to that disk blade 32.

As used herein, the term "vegetation" refers to any type of plant matter that is living in the field. In this respect, vegetation may include weeds, cover crops, and/or the like.

(204)-(212) describe one embodiment of determining whether vegetation is present within the lanes of the field aft of the disk blades 32. However, in alternative embodiments, the presence of vegetation within the lanes of the field may be determined in any other suitable manner.

In addition, as used herein, a "damaged" disk blade may be a disk blade that is bent, cracked, broken (e.g., a piece of the disk blade is missing), or completely missing (e.g., the entire disk blade has fall off or is otherwise is missing from the implement).

Furthermore, at (214), the control logic 200 includes initiating a control action when it is determined that the disk blade is damaged. Specifically, in several embodiments, when it is determined at (212) that one or more of the disk blades 32 are damaged, the computing system 110 may be configured to initiate one or more control actions. Such control action(s) may, in turn, facilitate correction of the broken disk blade(s) 32.

For example, the control action(s) initiated at (214) may include notifying the operator of the agricultural implement 10 that one or more of the disk blades 32 are damaged. Specifically, as mentioned above, in some embodiments, the computing system 110 may be communicatively coupled to the user interface 118 via the communicative link 112. In this respect, when it is determined that one or more disk blades 32 are damaged, the computing system 110 may transmit feedback signals to the user interface 118 via the communicative link 112. Such feedback signals, in turn, instruct the user interface 118 to provide a visual and/or audible notification indicating that one or more disk blades 32 are damaged. Thereafter, the operator may take any suitable corrective action(s) he or she deems appropriate.

Additionally, or alternatively, the control action(s) initiated at (214) may include halting movement of the agricultural implement 10. Specifically, as mentioned above, in some embodiments, the computing system 110 may be communicatively coupled to the vehicle drive component(s) 108 via the communicative link 112. As such, when it is determined that one or more disk blades 32 are damaged, the computing system 110 may transmit control signals to the vehicle drive component(s) 108 via the communicative link 112. Such control signals, in turn, instruct the vehicle drive component(s) 108 to operate in a manner the reduces the ground speed of and/or halts movement of the implement 10 in the direction of travel 22.

Moreover, in further embodiments, any other suitable control action(s) may be initiated at (214) in addition to or lieu of the control actions described above.

In addition, as indicated above, the control logic 200 described above may be implemented on a lane-by-lane basis. More specifically, there may, in many instances, be multiple lanes of the field aft of the agricultural implement 10. In this respect, the computing system 110 may identify when vegetation is present within each of the several lanes of the field simultaneously and then determine when the disk blades 32 are damaged on a lane-by lane basis. As an example, the computing system 110 may identify when vegetation is present in first and second lanes being worked by a first and second disk blades, respectively. Thereafter, the computing system 110 may independently determine that the first disk blade is damaged when there is vegetation present in the first lane and that the second disk blade is damaged when there is vegetation present within the second lane.

Referring now to FIG. 6, a flow diagram of one embodiment of a method 300 for detecting disk blade damage on an agricultural implement is illustrated in accordance with aspects of the present subject matter. In general, the method 300 will be described herein with reference to the agricultural implement 10 and the system 100 described above with reference to FIGS. 1-5. However, it should be appreciated by those of ordinary skill in the art that the disclosed method 300 may generally be implemented with any agricultural implements having any suitable implement configuration and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes receiving, with a computing system, image data depicting an aft portion of a field located rearward of a disk blade of an agricultural implement relative to a direction of travel of the agricultural implement, with the aft portion of the field including a lane of the field to be worked by the disk blade. For instance, as described above, the computing system 110 may be configured to receive image data from the imaging device(s) 102. The image data, in turn, depicts an aft portion of the field located rearward of the disk blades 32 of the agricultural implement 10 relative to the direction of travel 22, with the aft portion of the field including a lane of the field to be worked by each disk blade 32.

Furthermore, at (304), the method 300 includes analyzing, with the computing system, the received image data to identify when vegetation is present within the lane of the field. For instance, as described above, the computing system 110 may be configured to analyze the received image data to identify when vegetation is present within the lane(s) of the field.

Additionally, at (306), the method 300 includes determining, with the computing system, that the disk blade is damaged when the vegetation is present within the lane of the field. For instance, as described above, the computing system 110 may be configured to determine that one or more of the disk blades 32 are damaged when the vegetation is present within the corresponding lane(s) of the field.

Moreover, at (308), the method 300 includes initiating, with the computing system, a control action when it is determined that the disk blade is damaged. For instance, as described above, the computing system 110 may be configured to initiate one or more control actions when it is determined that one or more of the disk blade(s) 32 are damaged. For example, such control action(s) may include notifying the operator of the agricultural implement 10 that one or more of the disk blade(s) 32 are damaged and/or halting movement of the agricultural implement 10.

It is to be understood that the steps of the control logic 200 and the method 300 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the control logic 200 and the method 300, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
    a frame;
    a plurality of disk blades supported relative to the frame and configured to rotate relative to soil within a field across which the agricultural implement is traveling;
    an imaging device configured to generate image data depicting an aft portion of the field located rearward of the disk blade relative to a direction of travel of the agricultural implement, the aft portion of the field including a plurality of lanes of the field, each lane of the plurality of lanes to be worked by a corresponding disk blade of the plurality of disk blades; and
    a computing system communicatively coupled to the imaging device, wherein the computing system:
        classifies each pixel within the generated image data as one of a vegetation pixel or a non-vegetation pixel;
        determines a number of the vegetation pixels present within each lane;
        determines that a given disk blade of the plurality of disk blades is missing when the determined number of the vegetation pixels within the lane of the field corresponding to the given disk blade exceeds a threshold value; and
        initiates at least one of notifying an operator of the agricultural implement that the given disk blade is missing or halting movement of the agricultural implement when it is determined that the given disk blade is missing.

2. The agricultural implement of claim 1, wherein when classifying each pixel, the computing system classifies each pixel within the generated image data as one of the vegetation pixel or the non-vegetation pixel based on a color of the corresponding pixel.

3. A system for detecting disk blade damage on an agricultural implement, the system comprising:
    a plurality of disk blades configured to rotate relative to soil within a field across which the agricultural implement is traveling;
    an imaging device configured to generate image data depicting an aft portion of the field located rearward of the disk blade relative to a direction of travel of the agricultural implement, the aft portion of the field including a plurality of lanes of the field, each lane of the plurality of lanes to be worked by a corresponding disk blade of the plurality of disk blades; and a computing system communicatively coupled to the imaging device, the computing system:

classifies each pixel within the generated image data as one of a vegetation pixel or a non-vegetation pixel;

determines a number of the vegetation pixels present within each lane;

determines that a given disk blade of the plurality of disk blades is missing when the determined number of the vegetation pixels within the lane of the field corresponding to the given disk blade exceeds a threshold value; and initiates at least one of notifying an operator of the agricultural implement that the given disk blade is missing or halting movement of the agricultural implement when it is determined that the given disk blade is missing.

4. The system of claim 3, wherein when classifying each pixel, the computing system classifies each pixel within the generated image data as one of a vegetation pixel or a non-vegetation pixel based on a color of the corresponding pixel.

5. The system of claim 3, wherein the vegetation comprises at least one of weeds or cover crops.

6. A method for detecting disk blade damage on an agricultural implement, the agricultural implement including a plurality of disk blades configured to rotate relative to soil within a field across which the agricultural implement is traveling, the method comprising:

receiving, with a computing system, image data depicting an aft portion of the field located rearward of the disk blade relative to a direction of travel of the agricultural implement, the aft portion of the field including a plurality of lanes of the field, each lane of the plurality of lanes to be worked by a corresponding disk blade of the plurality of disk blades;

classifying, with the computing system, each pixel within the generated image data as one of a vegetation pixel or a non-vegetation pixel;

determining, with the computing system, a number of the vegetation pixels present within each lane;

determining, with the computing system, that a given disk blade of the plurality of disk blades is missing when the determined number of the vegetation pixels within the lane of the field corresponding to the given disk blade exceeds a threshold value; and initiating, with the computing system, at least one of notifying an operator of the agricultural implement that the given disk blade is missing or halting movement of the agricultural implement when it is determined that the given disk blade is missing.

7. The method of claim 6, wherein classifying each pixel comprises classifying, with the computing system, each pixel within the received image data as one of the vegetation pixel or the non-vegetation pixel based on a color of the corresponding pixel.

* * * * *